(12) United States Patent
Kinnier

(10) Patent No.: US 6,604,245 B1
(45) Date of Patent: Aug. 12, 2003

(54) LEAF GATHERING TROUSERS

(76) Inventor: Paul Frederic Kinnier, 7143 Stockley Rd., Upper Darby, PA (US) 19082

( * ) Notice: Subject to any disclaimer, the term of this patent is extended or adjusted under 35 U.S.C. 154(b) by 0 days.

(21) Appl. No.: 10/132,459

(22) Filed: Apr. 26, 2002

(51) Int. Cl.[7] ............................................... A41D 13/02
(52) U.S. Cl. .................................................. 2/227; 2/69
(58) Field of Search .............................. 2/227, 22, 23, 2/69, 69.5, 70, 231, 232, 233, 332, 333; 482/124

(56) References Cited

U.S. PATENT DOCUMENTS

| | | | | |
|---|---|---|---|---|
| 1,178,165 A | * | 4/1916 | Lupton | 280/810 |
| 2,180,544 A | * | 11/1939 | Nissen | 294/55.5 |
| 2,546,113 A | * | 3/1951 | Spang | 294/1.1 |
| 4,104,742 A | * | 8/1978 | Rahaim | 2/213 |
| 4,378,670 A | * | 4/1983 | Check et al. | 56/400.01 |
| 4,601,066 A | * | 7/1986 | Campbell | 2/70 |
| 4,815,731 A | * | 3/1989 | Suarez et al. | 482/124 |
| 4,866,922 A | * | 9/1989 | Clark | 56/400.04 |
| 5,176,600 A | * | 1/1993 | Wilkinson | 482/124 |
| 5,267,928 A | * | 12/1993 | Barile et al. | 482/124 |
| 5,357,637 A | * | 10/1994 | Moore | 2/227 |
| 5,377,693 A | * | 1/1995 | Loper et al. | 128/845 |
| 5,490,826 A | * | 2/1996 | Rose | 482/74 |
| 5,573,487 A | * | 11/1996 | Wallner | 482/124 |
| 5,609,012 A | * | 3/1997 | Anthes et al. | 56/400.01 |
| 6,095,340 A | * | 8/2000 | Dedrick | 209/417 |
| 6,477,716 B2 | * | 11/2002 | Blaire | 2/227 |

* cited by examiner

*Primary Examiner*—John J. Calvert
*Assistant Examiner*—Alissa L. Hoey

(57) ABSTRACT

A leaf gathering trouser comprised of a pair of flexible leg stalls and a flexible net, said net attached at opposing side edges to cooperating portions of the leg stalls and substantially occupying a space between the leg stalls in order to make contact with loose leaves located upon a ground surface and to accumulate said leaves into a pile for disposal while a user is wearing the leg stalls and walking in a normal manner. The net, comprised of a web section and a solid section, can be permanently attached to the leg stalls or releasably attached thereto by means of cooperating rows of zippers and zipper heads.

17 Claims, 3 Drawing Sheets

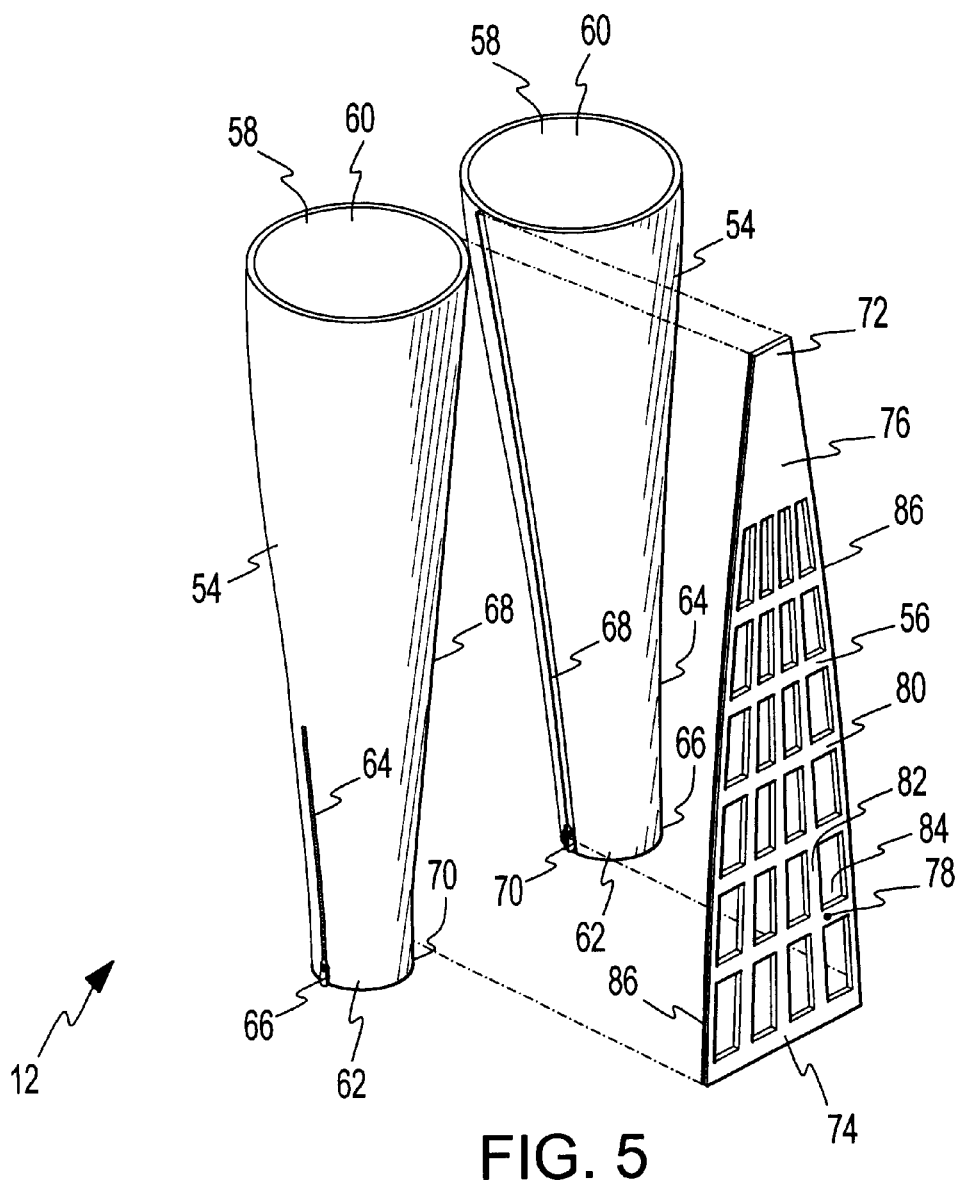
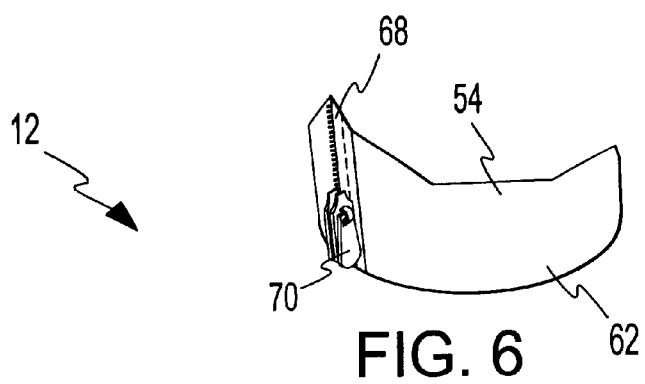

LEAF GATHERING TROUSERS

BACKGROUND OF THE INVENTION

This version of the invention is concerned with the field of leaf gathering and collection devices. More specifically, this version of the invention is concerned with leaf gathering trousers that are constructed with a trouser or pant portion and a flexible net either permanently or releasably attached thereto.

Collecting and gathering leaves that have fallen to the ground has proven to be a time consuming lawn and yard chore, especially in geographic locations that are characterized by a preponderance of deciduous trees and shrubs that drop their leaves in the fall season. A variety of tools and devices, which are available in the marketplace, are used to collect and gather these leaves and include but are not limited to rakes, power blowing and vacuuming devices, scoops, and the like. Each tool and device functions to a limited degree to collect and gather leaves but suffers from certain limitations and disadvantages. Rakes, for instance, are cumbersome and strenuous to use for some people and remove leaves only from a limited area during each stroke. Gasoline and electric powered blowing and vacuuming devices are relatively expensive and can be cumbersome to use. In addition, their use requires provision of a fuel source and constant maintenance to ensure adequate service.

What is needed then to overcome the aforementioned disadvantages of current leaf gathering and collection devices is the provision of a device or item that collects and gathers leaves in a manner that is relatively simplified and efficient and compatible with the natural body movement of a person. In this respect, the instant invention consists of modified pants or trousers that are fitted with a net between the leg stalls thereof so that leaf collecting and gathering can be accomplished by walking. Additionally, the instant invention, if desired, can be used in conjunction with a rake to enhance the leaf collecting and gathering process.

SUMMARY OF THE INVENTION

The present version of the invention, which will be described in greater detail hereinafter, relates to the field of leaf gathering and collection devices. More specifically, this version of the invention is concerned with leaf gathering trousers that are constructed with a trouser or pant portion and a flexible net either permanently or releasably attached thereto. My version of the invention overcomes all of the shortcomings listed previously, in addition to novel aspects that will be described in detail hereinafter.

Described briefly, according to a typical embodiment, the invention presents a pair of leaf gathering trousers that are comprised of two leg stalls and a net that is attached on opposing side edges to facing sides of the leg stalls. The two leg stalls are fabricated of first and second outer layers of durable material, such as canvas, and an inner layer of insulation surrounded or enclosed by said first and second outer layers of material. In a first embodiment of the invention, the net is permanently attached to the leg stalls, and in a second embodiment the net is releasably attached by zippers to the leg stalls. The lower portion of each leg stall can be separated or closed by a zipper and zipper head, which aids in the donning and removal of each leg stall from the leg of a wearer.

The net is triangular in shape in that it has a wider base or bottom end and tapers to a narrow end or tip commensurate with the crotch area of the trousers. The net generally consists of a majority web section that is commensurate with the lower portion thereof and a lesser solid section located at the upper end thereof. The net is constructed of first and second exterior layers of material, such as canvas, with a layer of resilient material, such as foam rubber, situated therebetween.

With either embodiment, leaves can be collected and gathered simply by walking into a pile of leaves and walking or directing the leaves toward a specific direction in order to accumulate the leaves into a pile. This process can be enhanced by use of a hand rake.

My invention, therefore, resides not in any one of these features per se, but rather in the particular combination of all of them herein disclosed. It is distinguished from the prior art in this particular combination of all of its structures for the functions specified. In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention and that such equivalent methods and structures do not depart from the spirit and scope of the invention.

As such, those skilled in the art will appreciate that the conception, upon which this disclosure is based, may readily be utilized as a basis for the designing of other structures, methods and systems for carrying out the several purposes of the present invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Further, the purpose of the foregoing summary is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The summary is neither intended to define the invention of the application nor is it intended to be limiting as to the scope of the invention in any way.

OBJECTS OF THE INVENTION

Accordingly, it is an object of my version of the invention to provide low-cost, easy-to-manufacture, and easy-to-market leaf gathering trousers.

A further object of my version of the invention is to provide easy-to-use and versatile leaf gathering trousers.

A significant object of the invention is to provide leaf gathering trousers that are comprised of two leg stalls with the lower portion of each leg stall able to be opened or closed by a zipper or other means to permit donning and removing of said trousers and further comprised of a net that is either permanently attached or releasably attached by zippers or other means to facing sides of the leg stalls.

A final but very significant object of the invention is to provide leaf gathering trousers that are worn over the legs of a wearer and accommodate and function in response to the natural body movement of said wearer, such as walking, in order to gather and collect leaves efficiently and naturally, thereby overcoming the aforementioned disadvantages of conventional leaf gathering devices.

Other objects and advantages of the present invention will become apparent from the following descriptions, taken in connection with the accompanying drawings, wherein, by way of illustration and example, various embodiments of the present invention are disclosed.

For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention illustrated by the accompanying drawings.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 5 is a perspective view of a second embodiment of the leaf gathering trousers with the net portion thereof separated from the trousers portion.

FIG. 6 is a detailed, perspective view of a row of zipper teeth with zipper head attached to the bottom of a leg stall.

DRAWING REFERENCE NUMERALS

10 Leaf Gathering Trousers, First Embodiment
12 Leaf Gathering Trousers, Second Embodiment
14 Leg Stalls
16 Net
18 Top of Leg Stalls
20 Hollow
22 Bottom of Leg Stalls
24 Row of Zipper Teeth
26 Zipper Head
28 Top of Net
30 Bottom of Net
32 Solid section
34 Web section
36 Horizontal Member
38 Vertical Member
40 Aperture
42 First Exterior Layer
44 Second Exterior Layer
46 Middle Layer of Insulation
48 First Exterior Layer
50 Second Exterior Layer
52 Middle Layer of Foam Rubber
54 Leg Stalls, Second Embodiment
56 Net, Second Embodiment
58 Top of Leg Stalls
60 Hollow
62 Bottom of Leg Stalls
64 Row of Zipper Teeth
66 Zipper Head
68 Row of Zipper Teeth
70 Zipper Head
72 Top of Net
74 Bottom of Net
76 Solid section
78 Web section
80 Horizontal Member
82 Vertical Member
84 Aperture
86 Row of Zipper Teeth
88 User
90 Legs
92 Shoes
94 Leaves

DETAILED DESCRIPTION OF THE PREFERRED EMBODIMENTS

A detailed description of the preferred embodiments is provided herein. It is to be understood, however, that the present invention may be embodied in various other forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
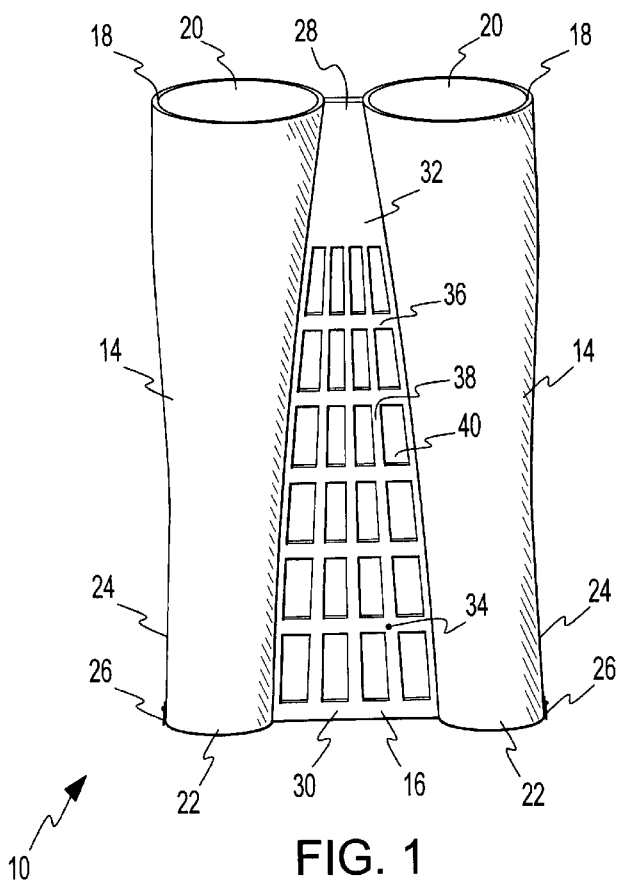
FIG. 1 is a perspective view of a first embodiment of leaf gathering trousers in accordance with the present version of the invention.
Figure 2:
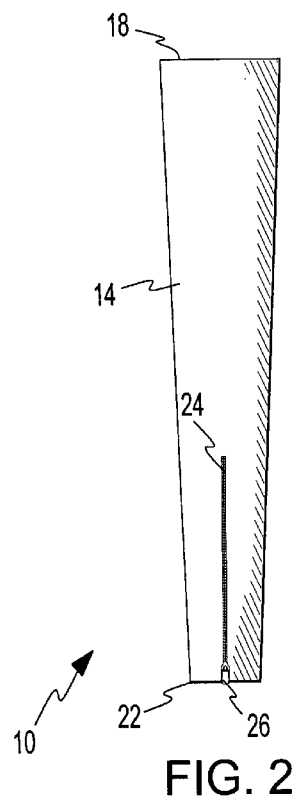
FIG. 2 is a side elevation view of a first embodiment of the leaf gathering trousers in accordance with the present version of the invention.

Referring now to the drawings and, in particular, to FIG. 1 and FIG. 2 wherein there are illustrated a first embodiment of the leaf gathering trousers 10. The present version of the invention 10 is comprised of a pair of let stalls 14 and a net 16, said net 16 attached by stitching or similar means to the facing sides of the leg stalls 14. The leg stalls 14 are comprised of a wider top end 18, hollow interior 20, and a narrower bottom end 22. Two rows of zipper teeth 24 with zipper head 26 are located at the lower portion of each leg stall 14, said zipper head 26 engaging the rows of zipper teeth 24 extending over the lower portion of said leg stall 14. The trousers 10 can be donned or removed by pulling up and pulling down the zipper heads 26 along the rows of zipper teeth 24 to separate and close, respectively, cooperating flaps located at the lower portion of the leg stalls 14 and adjacent to an individual row of zipper teeth 24. The net 16 is comprised of a narrower top portion 28 and a wider base or bottom portion 30. The net 16 is further defined by a solid section 32 and a web section 34, said web section 34 comprising a majority of the surface area of said net 16. The web section 34 is constructed of a series of elongate horizontal members 36 and vertical members 38 that intersect at various locations along the lengths thereof and enclose a series of apertures 40.

Figure 3:
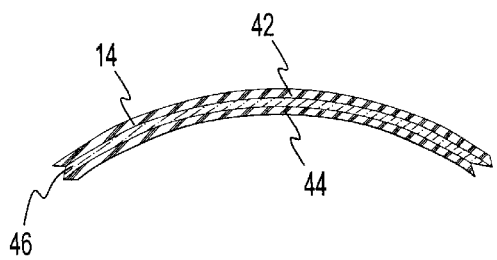
FIG. 3 is a partial cross section view of a leg stall of the leaf gathering trousers illustrating the construction thereof.

A partial cross sectional view of a trouser leg stall 14 is illustrated in FIG. 3 wherein said leg stall 14 is comprised of a first exterior layer of material 42 and a second exterior layer of material 44. A middle layer of material 46 is disposed between the first 42 and second 44 layers of material. The first 42 and second 44 exterior layers of material are comprised of material that is durable, lightweight, and resistant to moisture and liquids, said material consisting of lightweight canvas, various synthetic materials, and the like. The middle layer of material 46 is comprised of lightweight insulation or material having insulative characteristics such as that necessary to retain body heat in colder weather.

Figure 4:
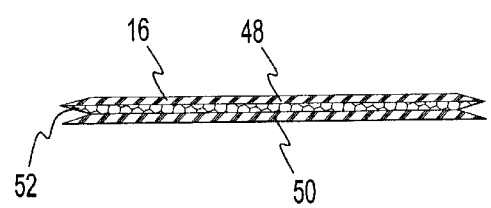
FIG. 4 is a partial cross section view of a net of the leaf gathering trousers illustrating the construction thereof.

The net 16 is displayed in partial cross sectional view in FIG. 4 and is comprised of a first exterior layer of material 48, a second exterior layer of material 50, and a middle layer of material 52. The first 48 and second 50 exterior layers of material are comprised of material that is durable, lightweight, and resistant to moisture and liquids, said material consisting of lightweight canvas, various synthetic materials, and the like. The middle layer of material 52 is comprised of lightweight, resilient material, such as foam rubber and the like.

Referring to FIG. 5, therein illustrated is a second embodiment 12 of the leaf gathering trousers having two leg stalls 54 that can be releasably attached to a net 56. Each leg stall 54 is comprised of a wider top end 58, a hollow interior 60, and a narrower bottom end 62. Two rows of zipper teeth 64 with cooperating zipper head 66 are located on the outside surface of each leg stall 54 at the lower portion thereof, and a single row of zipper teeth 68 with cooperating zipper head 70 is located on the outside surface of each leg stall 54 in opposition to the two rows of zipper teeth 64 and zipper head 66. The trousers 12 can be donned or removed by pulling up and pulling down the zipper heads 66 along the rows of zipper teeth 64 to separate and close, respectively, cooperating flaps located at the lower portion of the leg stalls 54 and adjacent to an individual row of zipper teeth 64.

The net 56 is comprised of a narrower top portion 72 and a wider base or bottom portion 74. The net 56 is further defined by a solid section 76 and a web section 78, said web section 78 comprising a majority of the surface area of said net 56. The web section 78 is constructed of a series of elongate horizontal members 80 and vertical members 82 that intersect at various locations along the lengths thereof and enclose a series of apertures 84. A row of zipper teeth 86 is affixed to opposing side edges of the net 56. The net 56 can be releasably attached to the leg stalls 54 by aligning the individual rows of zipper teeth 86 located on opposing sides of the net 56 to individual rows of zipper teeth 68 located on the leg stalls 54 and engaging the said rows of zipper teeth 68, 86 with the zipper head 70.

As shown in detail in FIG. 6, the zipper head 70 is positioned onto an individual row of zipper teeth 68 at the bottom 62 of a leg stall 54 before being engaged to a corresponding row of zipper teeth 86 on a cooperating side of the net 56. Once the rows of zipper teeth 68, 86 are engaged, the zipper head 70 can be pulled up to releasably attach the net 56 to the leg stall 54. In this manner, the net 56 can be attached to or separated from the leg stalls 54 in an efficient, trouble-free manner.

Figure 7:
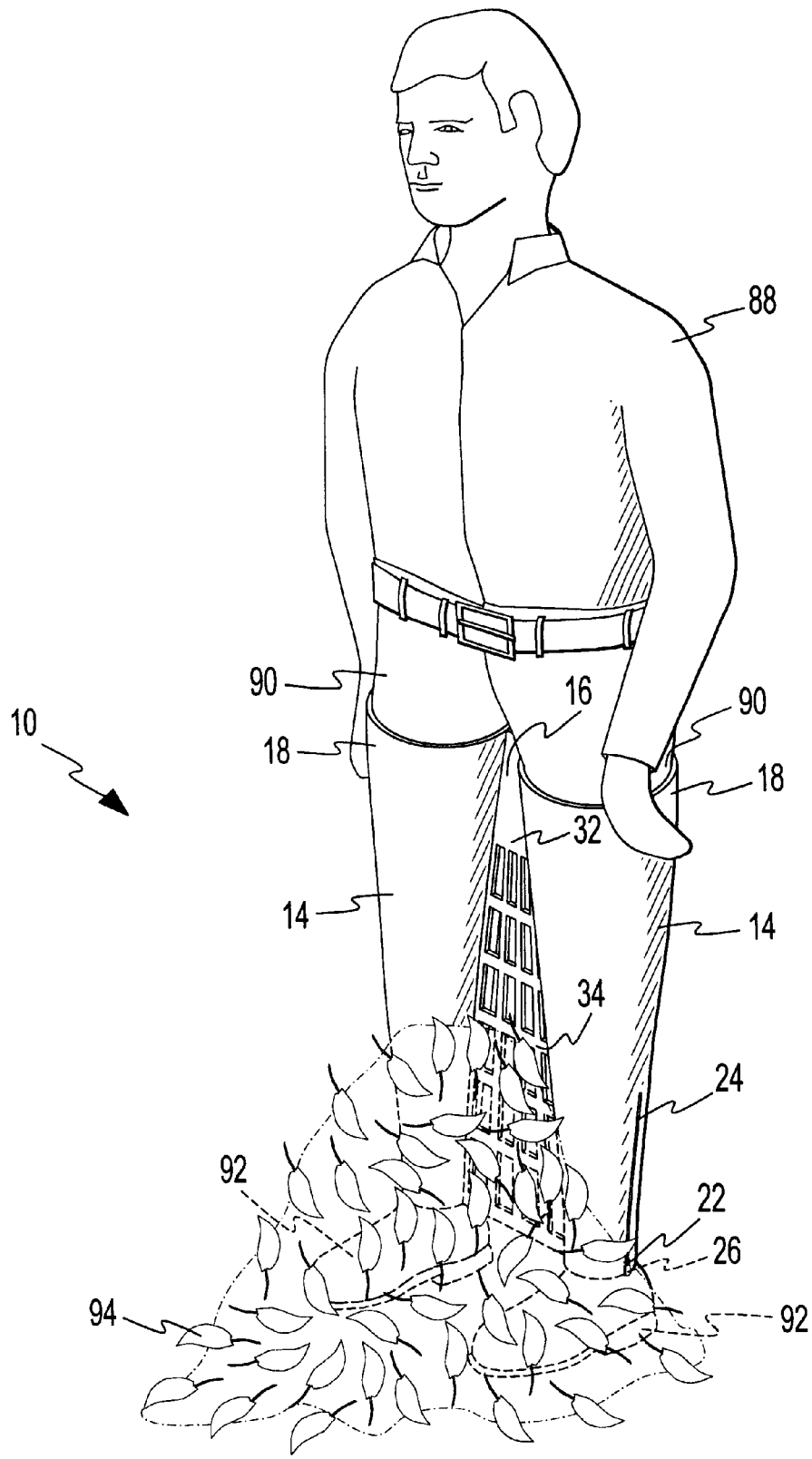
FIG. 7 is a perspective view of a user with a first embodiment of the leaf gathering trousers worn over the legs with said leaf gathering trousers being used to accumulate a quantity of leaves into one pile.

The first embodiment of the leaf gathering trousers 10 is illustrated in FIG. 7 as being worn by a user 88 to gather leaves. The legs 90 of the user 88 are disposed within the leg stalls 14 of the trousers 10 with the top end 18 of the leg stalls 14 located proximate to the waist of the user 88 and the bottom end 22 of the leg stalls 14 located adjacent to shoes 92 of the user 88. The user 88 can walk in a normal manner while wearing the trousers 10 as the leg stalls 14 and web 16 flex and conform to the movement of the legs and thus do not impede the movement of the user 88. As the user 88 walks upon a ground surface, the web section 34 of the net 16 makes contact with leaves 94 and collects and gathers said leaves 94 so that they begin to accumulate against said web section 34 of the net 16 into a manageable pile. Once the leaves 94 have been accumulated as illustrated, they can be easily transferred into a bag or receptacle for storage and disposal. The leaf gathering trousers 10 allows the user 88 to gather leaves 94 while using a normal walking motion without the necessity to employ tools such as rakes, the use of which requires a user to engage in series of repetitive, strenuous activities.

While this version of the invention has been illustrated and described in detail in the drawings and foregoing description, the same is to be considered as illustrative and not restrictive in character, it being understood that only the preferred embodiments have been shown and described and that all changes and modifications that come within the spirit of the version of the invention are desired to be protected.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

CONCLUSION AND SCOPE OF INVENTION

From the foregoing, it will be understood by persons skilled in the art that an improved leaf gathering trousers has been provided. The invention is relatively simple and easy to manufacture, yet affords a variety of uses. While my description contains many specificities, these should not be construed as limitations on the scope of the version of the invention, but rather as an exemplification of the preferred embodiments thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention.

While the invention has been described in connection with the preferred embodiments, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A pair of leaf gathering trousers for collecting and gathering loose leaves and other debris on the ground into a pile for disposal comprising:

(a) a pair of flexible leg stalls, each leg stall having a wider top end, a narrower bottom end, and a hollow interior, said leg stalls receiving and substantially covering the legs of a wearer; and (b) a flexible net attached at least near the bottom end and at opposing side edges thereof to facing sides of the leg stalls and substantially occupying the space between said leg stalls, said net comprised of a solid section and a web section having a plurality of apertures and making contact with loose leaves and other debris on a ground surface to accumulate said leaves into a pile for disposal, said accumulation of leaves accomplished when the leg stalls are worn over the legs of a wearer with said flexible net attached thereto and the wearer walking about the ground surface.

2. A pair of flexible leg stalls as recited in claim 1, in which each leg stall is comprised of a wider top end, a narrower bottom end, a hollow interior, and two rows of zipper teeth with cooperating zipper head, said rows of zipper teeth located on an exterior side of each leg stall adjacent to the bottom end thereof in opposition to the side of the leg stall that is attached to said net.

3. A pair of flexible leg stalls as recited in claim 1, in which each leg stall is comprised of a first exterior layer of woven material, a second exterior layer of woven material, and a third layer of insulative material located between first and second exterior layers of woven material.

4. A flexible net as recited in claim 1, in which the net at opposing side edges is attached by means of stitching to cooperating sections of the leg stalls.

5. A flexible net as recited in claim 1, in which the net is comprised of a majority web section and a solid section, said solid section located at the upper end of said flexible net.

6. A flexible net as recited in claim 5, in which the web section thereof is comprised of elongate horizontal members and elongate vertical members with said elongate horizontal members intersecting said elongate vertical members and forming a plurality apertures therebetween.

7. A flexible net as recited in claim 1, in which the flexible net is comprised of a first exterior layer of woven material, a second exterior layer of woven material, and a third layer of resilient material located between the first and second exterior layers of woven material.

8. A flexible net as recited in claim 7, in which the third layer of resilient material located between the first and second exterior layers of woven material is comprised of foam rubber.

9. A pair of leaf gathering trousers for collecting and gathering loose leaves and other debris on the ground into a pile for disposal comprising:

(a) a pair of flexible leg stalls, each leg stall having a wider top end, a narrower bottom end, and a hollow interior, said leg stalls receiving and substantially covering the legs of a wearer; and (b) a flexible net releasably attached at least near the bottom end and at opposing side edges thereof to facing sides of the leg stalls and substantially occupying the space between said leg stalls when attached thereto, said net comprised of a solid section and a web section having a plurality of apertures and making contact with loose leaves and other debris on a ground surface to accumulate said leaves into a pile for disposal, said accumulation of leaves accomplished when the leg stalls are worn over the legs of a wearer with said net releasably attached thereto and the wearer walking about the ground surface.

10. A pair of flexible leg stalls as recited in claim 9, in which each leg stall is comprised of a wider top end, a narrower bottom end, a hollow interior, two rows of zipper teeth with cooperating zipper head, said rows of zipper teeth located on an exterior side of each leg stall adjacent to the bottom end thereof in opposition to the side of the leg stall that is attached to said net, and a single row of zipper teeth with cooperating zipper head located on the side of each leg stall in opposition to said two rows of zipper teeth with cooperating zipper head, said single row of zipper teeth traversing the full length of said leg stall.

11. A pair of flexible leg stalls as recited in claim 9, in which each leg stall is comprised of a first exterior layer of woven material, a second exterior layer of woven material, and a third layer of insulative material located between first and second exterior layers of woven material.

12. A flexible net as recited in claim 9, in which the net is comprised of a majority web section and a solid section, said solid section located at the upper end of the said flexible net.

13. A flexible net as recited in claim 9, in which the web section thereof is comprised of elongate horizontal members and elongate vertical members with said elongate horizontal members intersecting said elongate vertical members and forming a plurality apertures therebetween.

14. A flexible net as recited in claim 9, in which the flexible net is comprised of a first exterior layer of woven material, a second exterior layer of woven material, and a third layer of resilient material located between the first and second exterior layers of woven material.

15. A flexible net as recited in claim 14, in which the third layer of resilient material located between the first and second exterior layers of woven material is comprised of foam rubber.

16. A flexible net as recited in claim 9, in which a row of zipper teeth is attached to first and second opposing side edges of said flexible net.

17. A flexible net as recited in claim 16, in which the net at opposing side edges thereof is releasably attached by means of rows of zipper teeth to cooperating rows of zipper teeth with zipper heads located on facing sides of said leg stalls.

* * * * *